United States Patent [19]
Binns et al.

[11] Patent Number: 5,923,733
[45] Date of Patent: *Jul. 13, 1999

[54] GROUP MESSAGE DELIVERY SYSTEM

[75] Inventors: Walter Patrick Binns, Upper Montclair; Bruce Lowell Hanson, Little Silver; Frederick Kenneth Schmidt, Califon, all of N.J.

[73] Assignee: AT&T, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/671,384

[22] Filed: Jun. 27, 1996

[51] Int. Cl.⁶ ................................... H04M 1/64
[52] U.S. Cl. ................... 379/88.23; 379/88.25; 379/69
[58] Field of Search ................ 379/67, 88, 89, 379/90.01, 93.01, 201, 69; 358/402

[56] References Cited

U.S. PATENT DOCUMENTS

| | | | |
|---|---|---|---|
| 5,247,591 | 9/1993 | Baran | 358/402 |
| 5,260,986 | 11/1993 | Pershan | 379/67 |
| 5,513,126 | 4/1996 | Harkins et al. | 358/402 |
| 5,592,541 | 1/1997 | Fleischer, III et al. | 379/211 |
| 5,630,060 | 5/1997 | Tang et al. | 379/89 |

OTHER PUBLICATIONS

"Subscriber Service Applications", http:/www.bostontechnology.com/ssa-vm.htm, date unknown.

*Primary Examiner*—Scott Weaver

[57] ABSTRACT

The invention provides a group message delivery system that includes a memory device coupled to a group message controller. The group message controller generates a group telephone number and a database corresponding to the group telephone number in the memory device based on first information received from a first caller. The first information includes a group list of at least one telephone number corresponding to at least one receiving party. The group message controller responds to a call by a second caller to the group telephone number by receiving second information from the second caller and delivering a message included in the second information to the at least one receiving party.

24 Claims, 5 Drawing Sheets

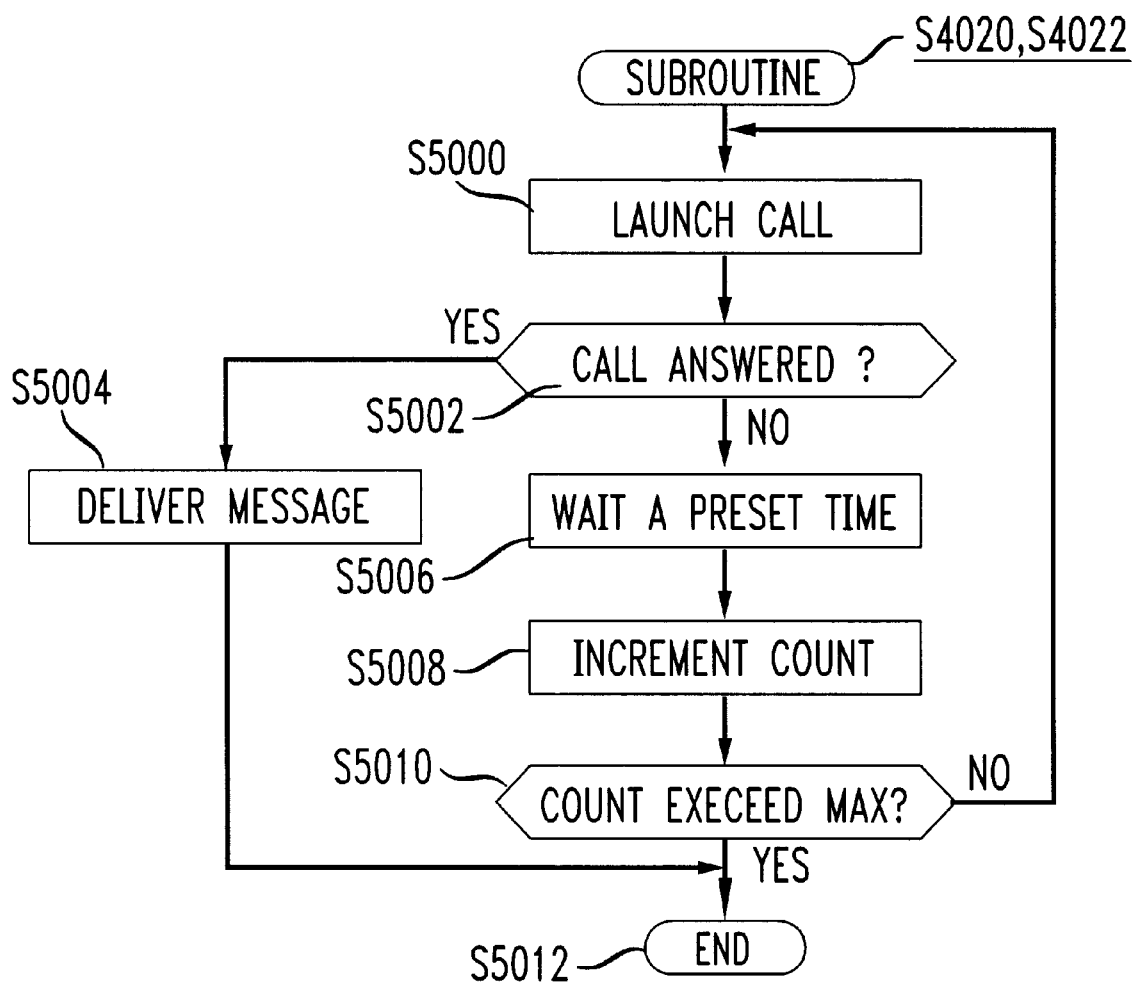

GROUP MESSAGE DELIVERY SYSTEM

BACKGROUND OF THE INVENTION

1. Field of the Invention

This invention relates to delivering voice messages or facsimiles over a telephone system.

2. Description of Related Art

Conventional telephone systems provide methods for callers to leave a voice message when the called party is not available to communicate with the caller. The voice messages are saved in a voice mailbox to be recalled by the called party at a later time.

When a group of telephone subscribers are associated in a special relationship such as a club or a business, it may be desired to leave a voice message to all the members of the group. Conventional voice mailbox systems require the same voice message to be delivered individually to each member of the group by the caller, thus causing great inconvenience.

Techniques such as a group mailbox have been proposed. A group mailbox is associated with a group having a group ID and a list of telephone numbers. A voice message sent to the group mailbox identified by the group ID is delivered to the list of telephone numbers associated with the group mailbox.

The group voice mailbox technique described above requires a caller to remember the special group voice mailbox number and the group ID assigned to the group voice mailbox. Thus, two numbers must be remembered. In addition, current systems restrict message recipients to have voice mailboxes on the same systems as the group voice mailbox. Further, a voice message cannot be placed in the group mailbox directly but interaction with the service provider is required before the voice message can be left in the group mailbox. While the group mailbox technique described above reduces the amount of inconvenience of earlier systems, additional improvements are still needed.

SUMMARY OF THE INVENTION

The invention provides for a group message delivery system that includes a group message controller. The group message controller generates a group telephone number based on first information received from a first caller. The group message controller responds to a call to the group telephone number by a second caller and then delivers a message based on second information received from the second caller and the first information received from the first caller.

The group message delivery system further includes a memory device coupled to the message controller and generates a database which stores in the memory device a group list of at least one telephone number included in the first information. The group message controller delivers the message to at least one receiving party by calling the at least one telephone number of the group list.

The database corresponding to the group telephone number also includes first and second passwords. The first password, if entered correctly by a caller, permits the caller to modify the database corresponding to the group telephone number. The group message controller delivers messages only from callers that correctly enter the second password.

BRIEF DESCRIPTION OF THE DRAWINGS

The invention is described in detail with reference to the following drawings, wherein like numerals represent like elements:

FIG. 6 is a flowchart of a call launch process.

DETAILED DESCRIPTION OF PREFERRED EMBODIMENTS

The invention provides a method and apparatus for a user to create a group telephone number that can be used to deliver group messages. The created group telephone number is associated with a group list of telephone numbers. Voice messages or facsimiles sent to the group telephone number are in turn sent to parties associated with each telephone number in the group list. The apparatus may be implemented by using hardware units such as application specific integrated circuits (ASICs) or by programs executed in a processor.

Figure 1:
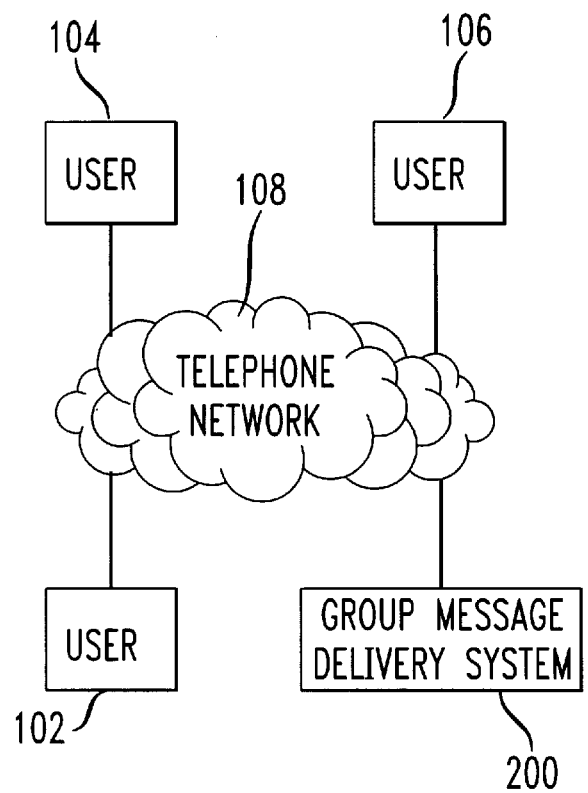
FIG. 1 is a block diagram of a telephone system including a group message delivery system.

FIG. 1 shows a group message delivery system 200 and users 102, 104 and 106 connected to a telephone network 108. Any user such as users 102, 104, 106 may call the group message delivery system 200 and create a group telephone number associated with a group. The telephone numbers of the members of the group are saved in a group list. The group message delivery system 200 may be called by dialing an 800 number, for example. After the group telephone number is created, the users 102, 104, 106 may share the group telephone number with others so that anyone may call the group telephone number to deliver a message or facsimile to every member of the group whose telephone numbers are in the group list associated with the group telephone number.

Figure 2:
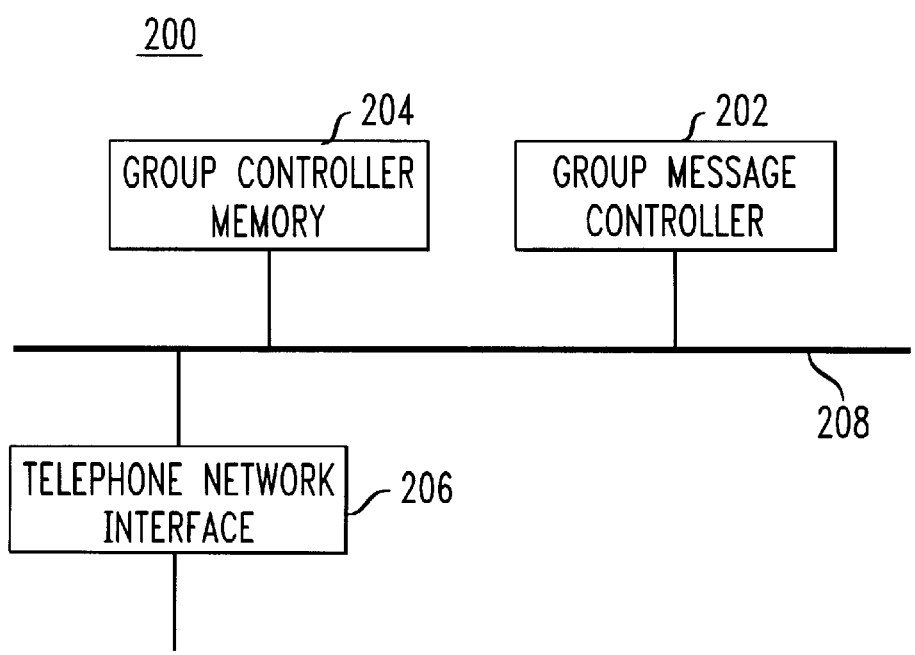
FIG. 2 is a block diagram of the group message delivery system.

The group message delivery system 200 includes a group message controller 202, a group controller memory 204 and a telephone network interface 206 as shown in FIG. 2. The group message delivery system 200 interfaces with the telephone network 108 through the telephone network interface 206. The telephone network interface 206 is coupled to the group message controller 202 and the group controller memory 204 through signal line 208. When a user 102, for example, calls the group message delivery system 200, the group message controller 202 responds by interacting with the user 102 to create a group telephone number and to establish a database in the group controller memory 204 that stores a group list of telephone numbers supplied by the user 102.

The group list may be provided by the user 102 to the group message controller 202 by using a telephone in a process discussed below. However, the user 102 may also construct a group list on a user terminal (not shown) such as a personal computer and upload the group list to the group message controller 202. Establishing the group list in this manner is desirable especially for large group lists. Having a faithful copy (or shadow) of the group list in the user terminal is also desirable because this allows the user 102 to peruse the group list and can modify the group list easily. Programs in the user terminal or the group message controller 202 may provide efficient and cost effective methods for maintaining the group list once the group list is established.

Figure 3:
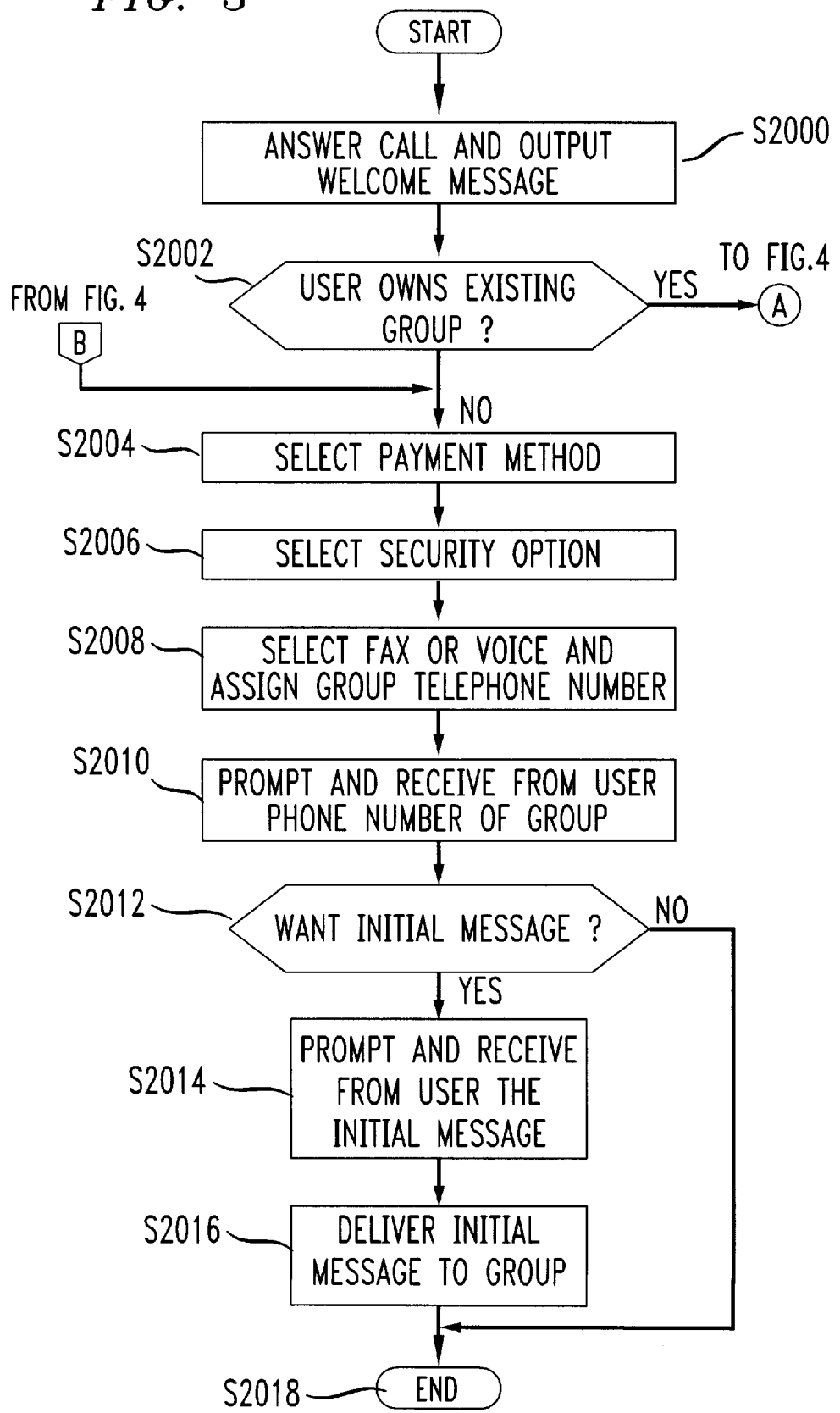
FIG. 3 is a flowchart for establishing a group telephone number.

FIG. 3 is a flowchart of the group message controller process after a user 102 calls the group message delivery system 200. In step S2000, the group message controller 202 of the group message delivery system 200 answers the user 102's call, outputs a welcome message and then goes to step S2002.

In step S2002, the group message controller 202 searches the group controller memory 204 to determine whether a group telephone number has been created by the user 102. If the user 102 has created a group telephone number, the group message controller 202 goes to step S3000 shown in FIG. 4; otherwise, the group message controller 202 goes to step S2004 and proceeds to create a database to be associated with a new group telephone number.

In step S2004, the group message controller 202 queries and receives from the user 102 the desired payment method to be used for the cost associated with the group telephone number. Many options are available such as each caller of the group telephone number pays for the cost for delivering the message or facsimile; the creator of the group telephone number pays for all message delivery costs; or the creator of the group telephone number and the calling party pays for message delivery costs according to a formula. After determining the payment method, the group message controller 202 goes to step S2006.

In step S2006, the group message controller 202 queries the user 102 for a password to protect the database created by the user 102. This password protection is optional. However, if the database is unprotected, anyone having access to the group telephone number may possibly change the group list or other information such as payment method.

The group message controller 202 may also query the user 102 for a second password to control access to the group telephone number. A second password would restrict the number of callers that can send voice messages or facsimiles to the group. This is useful to prevent abuse of the group message delivery system 200, for example. If a second password is desired, the group message controller 202 will deliver a voice message only if a caller enters the second password correctly.

The user 102 may also specify options such as requiring correct entry of the second password only for callers not associated with the group list. Thus, if a caller's telephone number is in the group list of telephone numbers, then a second password is not required. However, if the caller's telephone number is not in the group list, then the group message controller 202 will deliver a message for the caller only when the caller correctly enters the second password.

After the user 102 selects the security options, the group message controller 202 goes to step S2008. In step S2008, the group message controller 202 assigns a group telephone number such as an 800 number or a block of telephone numbers allocated for this purpose and creates a group database associated with the group telephone number in the group controller memory 204. Then, the group message controller goes to step S2010.

In step S2010, the group message controller 202 prompts and receives from the user 102 a list of telephone numbers to be associated with the group telephone number as a group list. The group message controller 202 also receives from the user 102 an indication whether the list of telephone numbers are for voice messages or facsimiles. Various group list functions may also be selected. For example, a simple group list function would be to dial each of the telephone numbers in the group list to deliver a voice message or facsimile to receiving parties.

Another more sophisticated function would be to associate a sub-list of telephone numbers in the group list with a receiving party. When a voice message or facsimile is being delivered, the group message controller 202 dials a first telephone number of the sub-list and attempts to deliver the voice message or facsimile to the receiving party. If the line of the dialed telephone number is busy or otherwise not able to receive the voice message or facsimile, the group message controller 202 goes on-hook and then dials a second telephone number of the sub-list and so on until the voice message or facsimile is delivered. This feature gives greater assurance that a message or facsimile would be delivered even if some of the telephone numbers are not answered, busy or otherwise inoperative. For example, a subscriber may have several different telephone numbers for different locations such as one for the home, one for the office, one for the car, etc.

After the group list of telephone numbers is received, the group message controller 202 enters the group list of telephone numbers in the database associated with the group telephone number in the group controller memory 204. Then, the group message controller 202 goes to step S2012.

In step S2012, the group message controller 202 optionally prompts the user 102 for an initial message to be sent to all the parties of the group list. If the user 102 desires to send such a message, the group message controller 202 goes to step S2014; otherwise, the group message controller 202 goes to step S2018 and ends the telephone call with the user 102.

In step S2014, the group message controller 202 prompts and receives from the user 102 the initial message and then goes to step S2016. In step S2016, the group message controller 202 delivers the initial message to all the parties in the group list and then goes to step S2018 and ends the telephone call with the user.

Figure 4:
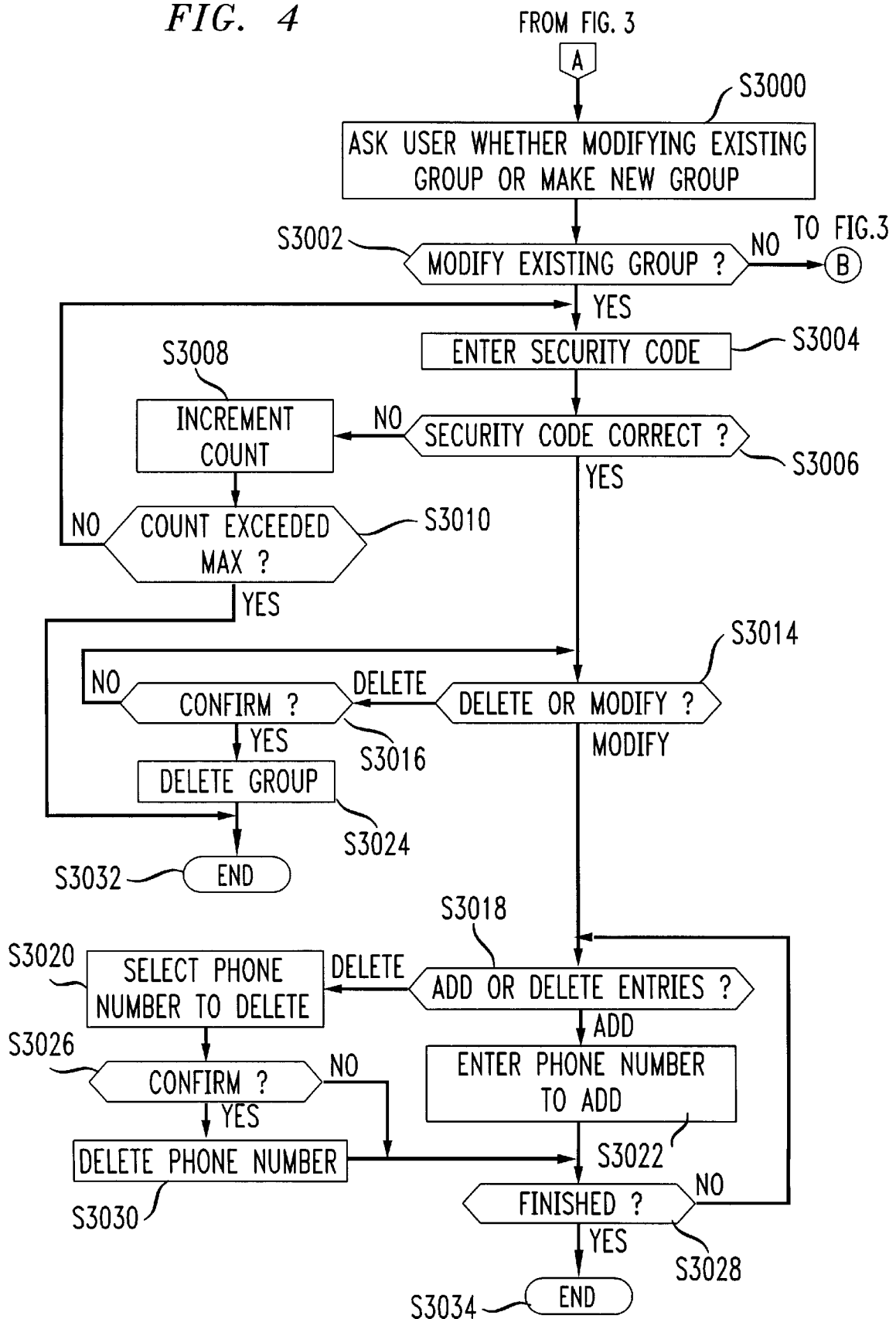
FIG. 4 is a flowchart of a group database modification process.

In FIG. 4, the group message controller 202 permits the user 102 to modify the database of an existing group telephone number. In step S3000, the group message controller 202 queries whether the user 102 would like to modify the database of an existing group telephone number or to create a new group telephone number and then goes to step S3002. In step S3002, if the user desires to create a new group telephone number, the group message controller 202 goes to step S2002 shown in FIG. 4; otherwise, the group message controller 202 goes to step S3004.

In step S3004, the group message controller 202 requests the user 102 to enter a group telephone number and the password associated with the group telephone number and then goes to step S3006. In step S3006, the group message controller 202 searches the group database associated with the group telephone number and verifies whether the password entered by the user 102 is correct. If the password is correct, the group message controller 202 goes to step S3014; otherwise, the group message controller 202 goes to step S3008.

In step S3008, the group message controller 202 increments a count and goes to step S3010. In step S3010, the group message controller 202 tests whether the count value exceeds a preset maximum value. If the count value exceeds the preset maximum value, then the group message controller 202 goes to step S3032 and ends the telephone call with the user. Otherwise, the group message controller 202 returns to step S3004 and again requests the user 102 to enter the group telephone number and the associated password.

In step S3014, the group message controller 202 queries whether the user 102 would like to delete a group telephone number and the associated database or whether the user 102 would like to modify the group list of telephone numbers. If the user 102 chooses to delete the group telephone number and the associated database, the group message controller 202 goes to step S3016; otherwise, the group message controller 202 goes to step S3018.

In step S3016, the group message controller 202 requests the user 102 to confirm the deletion of the group telephone number and the associated database. If the user 102 confirms the deletion of the group telephone number, the group message controller 202 goes to step S3024 and deletes the group telephone number and the associated database from the group controller memory 204 and then goes to step S3032 to end the telephone call with the user. Otherwise, the group message controller 202 returns to step S3014.

In step S3018, the group message controller 202 queries whether the user 102 would like to add or delete telephone numbers in the group list. If the user 102 chooses to delete telephone numbers in the group list, the group message controller 202 goes to step S3020; otherwise, the group message controller 202 goes to step S3022. In step S3020, the group message controller 202 prompts the user 102 to select the telephone number to be deleted from the group list and goes to step S3026. In step S3026, the group message controller 202 requests the user 102 to confirm the delete request. If the user 102 confirms the delete request, the group message controller 202 goes to step S3030 and deletes the telephone number from the group list and then goes to step S3028. Otherwise, the group message controller 202 goes to step S3028 directly.

In step S3022, the group message controller 202 prompts the user 102 to enter a telephone number to be added to the group list. After the user 102 enters the telephone number to be added, the group message controller 202 adds the telephone number to the group list and goes to step S3028. In step S3028, the group message controller 202 queries the user 102 whether modification of the group list associated with the group telephone number is completed. If modification of the group list is completed, the group message controller 202 goes to step S3034 and ends the telephone call with the user. Otherwise, the group message controller 202 returns to step S3018 and continues the process for modifying the group list.

Figure 5:
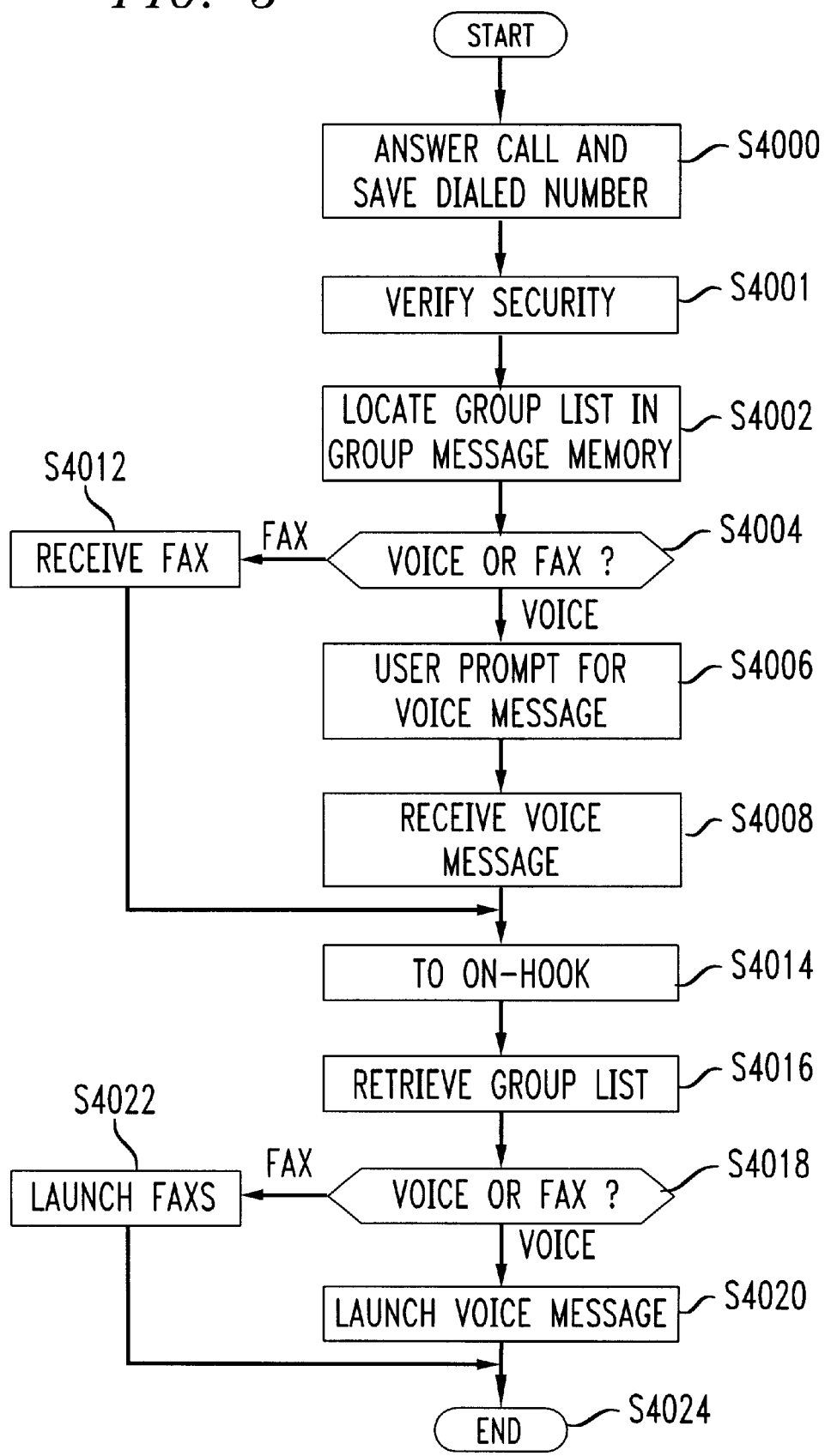
FIG. 5 is a flowchart for leaving a message/facsimile by calling a group telephone number.

FIGS. 5 and 6 show the process of the group message controller 202 when a party calls the group telephone number. In step S4000, the group message controller 202 answers a call from a caller to the group telephone number. The group message controller 202 saves the dialed group telephone number for locating the associated database in the group controller memory 204 and goes to step S4001.

In step S4001, the group message controller 202 requests the caller to enter the second password set by the user 102 based on the security options selected by the user 102. For example, if the user 102 did not restrict the number of callers that can send messages to the group, then the group message controller 202 would not request the second password and will deliver messages from any one who calls the group telephone number. If a second password is required, then the group message controller will only deliver a message for callers that correctly entered the second password. Then the group message controller 202 goes to step S4002.

In step S4002, the group message controller 202 searches the group controller memory 204 and locates the database associated with the dialed group telephone number. Then the group message controller 202 goes to step S4004.

In step S4004, the group message controller 202 determines from the database whether the dialed group telephone number is a voice message telephone number or a facsimile telephone number. If the group telephone number is a voice message telephone number, the group message controller 202 goes to step S4006; otherwise, the group message controller 202 goes to step S4012.

In step S4006, the group message controller 202 outputs a voice prompt to the calling party to leave a voice message and then goes to step S4008. In step S4008, the group message controller 202 receives the voice message from the calling party and optionally allows the calling party to edit the voice message. Then, the group message controller 202 goes to step S4014. In step S4012, the group message controller 202 receives a facsimile from the calling party and goes to step S4014.

In step S4014, the group message controller 202 goes on-hook with respect to the caller and then goes to step S4016. In step S4016, the group message controller 202 retrieves the group list from the database in the group controller memory 204 and then goes to step S4018.

In step S4018, the group message controller 202 determines whether a voice message or a facsimile is to be delivered. If a voice message is to be delivered, the group message controller 202 goes to step S4020; otherwise, the group message controller 202 goes to step S4022. In step S4020, the group message controller 202 launches telephone calls for each of the parties in the group list, delivers the voice message and then goes to step S4024 to end the message delivery process. In step S4022, the group message controller 202 launches calls to each of the parties in the group list through facsimile ports to send the facsimile data to each of the facsimile telephone numbers in the group list. Then the group message controller 202 goes to step S4024 and ends the facsimile delivery process.

The process of steps S4022 and S4020 is shown in greater detail in FIG. 6 for each of the dialed telephone numbers in the group list. In step S5000, the group message controller 202 launches a telephone call for one of the telephone numbers in the group list and goes to step S5002. In step S5002, the group message controller 202 determines whether the launched telephone call is answered. If the telephone call is answered, then the group message controller 202 goes to step S5004; otherwise, the group message controller 202 goes to step S5006. In step S5004, the group message controller 202 delivers either the voice message or the facsimile to the answering party and then goes to step S5012 and ends the message/facsimile delivery process for one of the telephone numbers in the group list.

In step S5006, the group message controller 202 waits for a predetermined amount of time and then goes to step S5008. In step S5008, the group message controller 202 increments a count and goes to step S5010. In step S5010, the group message controller 202 determines whether the count exceeded a preset maximum value. If the count exceeded the preset maximum value, the group message controller 202 goes to step S5012 and ends the message delivery process. Otherwise, the group message controller 202 returns to step S5000 and relaunches the telephone call again to attempt delivery of the voice message or facsimile.

The process of steps S5006–S5012 would not be executed if the optional sub-list of telephone number is used. In that case, if a telephone call is not answered after a predetermined amount of time or is not able to be completed because of a busy signal, for example, the group message controller 202 simply goes on-hook and dials a next telephone number in the sub-list. If none of the telephone numbers are answered, the group message controller 202 may either end the voice message/facsimile delivery for that party or come back to it at a later time.

While this invention has been described in conjunction with specific embodiments thereof, it is evident that many alternatives, modifications, and variations will be apparent to those skilled in the art. Accordingly, preferred embodiments of the invention as set forth herein are intended to be illustrative not limiting. Various changes may be made without departing from the spirit and scope of the invention as defined in the following claims.

What is claimed is:

1. A group message delivery system for delivering a message to members of a group through a telephone network, comprising:

group message controller in communication with the telephone network and initialized by a first calling party by calling the group message controller and inputting first information through the telephone network to generate a group telephone number, the group telephone number associated with a plurality of member telephone numbers with at least one member telephone number being associated with each member of the group, the group message controller responding to a call to the group telephone number by a subsequent calling party and automatically delivering the message to each member of the group based on second information received from the subsequent calling party and the first information, the messages being automatically delivered to each member of the group without additional input by any members of the group.

2. The group message delivery system of claim 1, further comprising:

a memory device coupled to the group message controller, wherein the first information received from the first calling party includes a group list, the group message controller storing the group list in the memory device, the group list including at least one telephone number.

3. The group message delivery system of claim 2, wherein the group message controller delivers the message to at least one receiving party by calling the at least one telephone number stored in the memory device.

4. The group message delivery system of claim 2, wherein the at least one telephone number of the group list includes an ordered list of telephone numbers.

5. The group message delivery system of claim 4, wherein the group message controller delivers the message to a receiving party by calling at least one telephone number of the ordered list of telephone numbers in an order of the ordered list, the group message controller delivering the message to the receiving party during a first call answered by the receiving party.

6. The group message delivery system of claim 1, further comprising:

a memory device coupled to the group message controller, the group message controller generating a database in the memory device corresponding to the group telephone number, wherein the first information received from the first calling party includes a first password, the group message controller storing the first password in the database, if the subsequent calling party correctly enters the first password, then the group message controller one of modifying the database and deleting the group telephone number based on a request from the subsequent calling party, if the subsequent calling party incorrectly enters the first password a first preset number of times, then the group message controller going on-hook with respect to the subsequent calling party.

7. The group message delivery system of claim 6, wherein the group message controller modifies the database by one of adding to and deleting from the at least one telephone number based on the request from subsequent calling party.

8. The group message delivery system of claim 6, wherein the first information received from the first calling party includes a second password, the group message controller storing the second password in the database, if the subsequent calling party correctly enters the second password, then the group message controller delivering the message, if the subsequent calling party incorrectly enters the second password a second preset number of times, then the group message controller going on-hook with respect to the subsequent calling party.

9. The group message delivery system of claim 1, wherein the message is one of a voice message and a facsimile.

10. The group message delivery system of claim 1, further comprising:

a memory device coupled to the group message controller, the group message controller charging for delivery of the message based on a payment method, wherein the first information received from the first calling party includes a selection of the payment method.

11. The group message delivery system of claim 10, wherein the payment method is at least one of the first calling party paying for delivering the message and the subsequent calling party paying for delivering the message.

12. A method for delivering a group message to members of a group using a group message controller in communication with a telephone network, comprising:

initializing the group message controller by a first calling party by calling the group message controller and inputting first information through the telephone network to generate a group telephone number associated with a plurality of member telephone numbers with at least one member telephone number being associated with each member of the group;

responding to a call to the group telephone number by any subsequent calling party; and automatically delivering a message to each member of the group based on second information received from the subsequent calling party and the first information, the messages being automatically delivered to each member of the group without additional input by any members of the group.

13. The method of claim 12, further comprising:

storing a group list in a memory device, the group list being included in the first information having at least one telephone number.

14. The method of claim 13, wherein the delivering step comprises:

retrieving the group list from the memory device;

calling the at least one telephone number of the group list retrieved from the memory device; and delivering the message to at least one receiving party.

15. The method of claim 13, wherein the delivering step comprises:

retrieving the group list from the memory device;

calling at least one telephone number of an ordered list of the telephone numbers included in the group list retrieved from the memory device; and delivering the message to a receiving party during a call answered by the receiving party.

16. The method of claim 13, further comprising:

generating a database in the memory device corresponding to the group telephone number;

storing a first password included in the first information received from the first calling party in the database, wherein if the subsequent calling party correctly enters the first password, then the group message controller one of modifies the database and deletes the group telephone number based on a request of the subsequent calling party, and if the subsequent calling party incorrectly enters the first password a first preset number of times, then the group message controller goes on-hook with respect to the subsequent calling party.

17. The method of claim 16, wherein the group message controller modifies the database by one of adding to and deleting from the at least one telephone number based on the request of the subsequent calling party.

18. The method of claim 16, further comprising:

storing a second password included in the first information received from the first calling party in the database, wherein if the subsequent calling party correctly enters the second password, then the group message controller delivers the message, and if the subsequent calling party incorrectly enters the second password a second preset number of times, then the group message controller goes on-hook with respect to the subsequent calling party.

19. The method of claim 12, wherein the message is one of a voice message and a facsimile.

20. The method of claim 12, further comprising:

charging for delivery of the message based on a payment method, wherein the first information received from the first calling party includes a selection of the payment method.

21. A method for delivering a message to members of a group using a group message controller in communication with a telephone network, comprising the steps of:

initializing the group message controller by a first party calling the group message controller through the telephone network and inputting first information to generate a group telephone number associated with a plurality of member telephone numbers, at least one of the plurality of member telephone numbers being associated with each member of the group;

answering a call to the group telephone number made by a subsequent calling party;

providing the message of the subsequent calling party to the initialized group message controller;

calling each member of the group through the initialized group message controller by dialing each of the at least one of the plurality of member telephone numbers associated with each member of the group; and automatically delivering the message to each member of the group answering the calling step, the messages being automatically delivered to each member of the group without additional input by any member of the group.

22. The method of claim 21, wherein the message is one of a voce message and a facsimile message.

23. A group message delivery system for delivering a message from a caller to members of a group through a telephone network, comprising:

a group message controller initialized by a first calling party through the telephone network to generate a group telephone number and operative for answering an incoming call from a subsequent calling party to the group telephone number associated with a plurality of member telephone numbers with at least one of the plurality of member telephone numbers being associated with each member of the group, receiving the message from any subsequent calling party, making an outgoing call to each of the at least one of the plurality of member telephone numbers associated with each member of the group and, automatically delivering the message of the subsequent calling party to each member of the group answering the outgoing call, the messages being automatically delivered to each member of the group without additional input by any member of the group.

24. The method of claim 23, wherein the message is one of a voice message and a facsimile message.

* * * * *